Feb. 16, 1932.　　　I. HECHENBLEIKNER　　　1,845,413
CONTACT METHOD OF SULPHURIC ACID MANUFACTURE
Filed Jan. 31, 1928
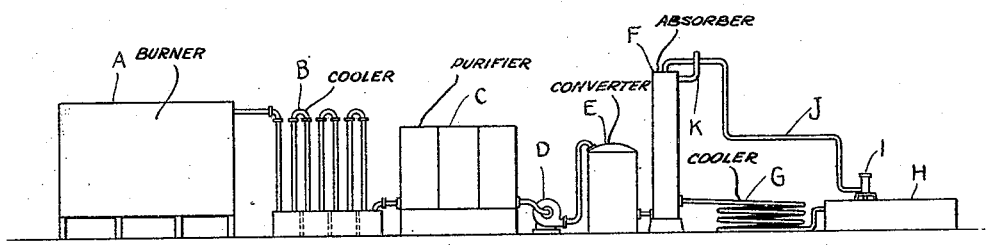
INVENTOR
Ingenuin Hechenbleikner
BY
ATTORNEYS Patented Feb. 16, 1932

1,845,413

UNITED STATES PATENT OFFICE

INGENUIN HECHENBLEIKNER, OF CHARLOTTE, NORTH CAROLINA, ASSIGNOR, BY MESNE ASSIGNMENTS, TO CHEMICAL CONSTRUCTION CORPORATION, A CORPORATION OF DELAWARE

CONTACT METHOD OF SULPHURIC ACID MANUFACTURE

Application filed January 31, 1928. Serial No. 250,843.

This invention relates to the art of sulphuric acid manufacture, and has special reference to the provision of an improved contact method of making sulphuric acid.

In contact methods of manufacturing sulphuric acid, oxygen or air is first passed through a pyrites burner or furnace wherein there is generated a mixture of sulphurous acid gas and air, which mixture is passed to a converter or catalyzer wherein the sulphurous acid gas is converted catalytically into sulphuric anhydrid. This sulphuric anhydrid is then passed through absorption apparatus where the final sulphuric acid product is obtained.

In the practice of this contact method of making sulphuric acid, it has long been known that the $SO_2$ gases generated in the burner or furnace must be purified to prevent the impurities therein from "poisoning" the contact mass of the converter or catalyzer; and this is accomplished by submitting the gases before they enter the contact space or chamber to a careful and complicated washing or purifying process until all of the injurious constitutents have been removed. The purification of the gases according to prior practise included the step of drying the gases so as to eliminate the moisture content of the same, and this was accomplished by the use of a drying tower located in the path of the gas flow either before or after the sulphur or pyrites furnace, the gases reaching the catalyzer being thereby thoroughly dried. The necessity of using drying apparatus and of thus purifying and drying the gas mixture involved a complication of the process and the apparatus employed therewith.

I have discovered that the contact process may be practised without this hitherto necessary yet objectionable air drying step, and that the remaining steps of the process, as well as the apparatus incident thereto, may be so interrelated and operated or practised as to produce an optimum yield of high strength sulphuric acid, such as a 98% concentration; and the improved process whereby these results are obtainable with the process and apparatus simplifications involved in the elimination of the air drying step is a prime object of my present invention.

To the accomplishment of the foregoing and such other objects as will hereinafter appear, my invention consists in the process, the steps of the process and the apparatus, as hereinafter more particularly described and sought to be defined in the claims, reference being had to the accompanying drawing which shows the preferred embodiment of my invention, and in which:

The figure is a flow sheet representation of the steps of the improved process.

Referring now more in detail to the drawing wherein the complete process from the production of the sulphurous acid gas to the final sulphuric acid product is shown, the mixture of air and sulphurous acid gas generated in the pyrites furnace or burner A is passed through a cooler B, the cooled gases entering the dust collector or purifier C where all dust in the gaseous mixture is removed, the gases being then delivered by the exhauster D to the converter E. The converted gas mixture containing the generated sulphuric anhydrid is then led directly into the absorption apparatus F fed with concentrated sulphuric acid from a circulating line J, into which acid from the tank H is pumped by means of the acid pump I, the absorbed acid produced in the absorption apparatus F being passed through the cooler G into the said acid tank H, part of the produced acid being thus employed in the circulating system of the absorption apparatus.

To accomplish the desired object of the invention, air containing a normal content of moisture is employed for the pyrites furnace A, and the drying tower or apparatus hitherto used for removing the moisture from the air is eliminated. To prevent the moisture containing air from poisoning or interfering with the operation of the contact apparatus or catalyzer, and to prevent the stopping up of the process between the catalyzer and absorber which would otherwise result from the use of moisture containing gases, I have discovered that the converter or catalyzer E may be provided with contact masses which are not affected by moisture nor poisoned by arsenic, chlorine, selenium, etc., and that the process may be carried out completely with the use of such contact masses by controlling the temperatures of the gaseous mixtures from the furnace to the absorber so as to maintain the temperatures of the same above the dew point of sulphuric acid. I have further found that by so practising the process, a high yield of 98% sulphuric acid may be readily obtained in the normal operation of the system used.

In the pyrites roasting stage of the process, fresh and undried air containing a normal moisture content is employed; and the mixture of air and sulphurous acid gases generated in the roasting furnace A, together with the moisture contents, at a temperature of about 1000° to 1200° F. are drawn through the gas cooler B by means of the exhaustor D, the gases being cooled thereby to a temperature of from 500° to 600° F. The gases are thus preferably cooled to a temperature substantially below that required for catalysis, this being desirable so as to render the next filtering or dust removing step more efficient, and so as to permit an adjustment of temperatures to take place in the catalyzing apparatus. The filtering of the gases is accomplished after the cooling step by means of the dry dust collector C, the gases being sufficiently cooled to render the filtration thereof easier of accomplishment. The temperature of the gases, however, is maintained above the dew point of sulphuric acid so as to prevent any undesirable condensation of gases in this stage of the process. While fresh and undried air may thus be used in the process of my present invention, it will be understood that the moisture content of the gas mixture should not be greater than is required for producing 98% sulphuric acid; and should the gases be supersaturated due either to an oversaturation of air or of the ore, then a partial drying may be found desirable just sufficient to reduce both the air and the ore to their normal moisture content.

In the catalysis stage of the process there is employed a catalyzer E of the heat exchange type embodying any construction known to the art in which the cooled gases coming from the filtering or dust collecting apparatus C and delivered by the exhauster D are reheated to the temperature required for efficient catalysis, such for example as to 750° to 850° F. In the operation of such heat exchange catalyzers, the excess heat generated during catalytic action which detrimentally affects the conversion stage and produces an undesirable reversion is utilized for the reheating of the sulphurous acid gases; and in this manner the temperatures in the catalyzing stage of the process may be nicely controlled and an optimum yield of conversion obtained. I have found in the practise of this process that a number of contact masses, such for example as vanadium compounds, may be employed in the catalyzer apparatus which are nonaffected by the moisture content of the gas mixture and which are also nonpoisoned by arsenic, chlorine, selenium, etc., a preferred contact mass comprising a vanadium oxide compound on a suitable carrier such as aluminum silicate. The temperatures of the exit gases coming from the converter E are, with the use of such apparatus, about 850° F.

The absorption stage of the process is practised by conducting the exit gases from the converter E directly into the absorption tower F, eliminating the gas cooler usually employed in prior practise between the converter and the absorption tower. Such an intermediate cooling stage would be objectionable in the practise of my process, since if used the moisture present would condense the sulphuric anhydrid and produce a resulting clogging of the process flow. Here, as well, the temperatures should be kept above the dew point of sulphuric acid. The exit gases containing the sulphuric anhydrid are therefore led directly into the absorption tower F and the absorption apparatus is constructed and operated so as to effect a concomitant cooling and absorption of the sulphuric anhydrid. To accomplish this, the sulphuric anhydrid gas is absorbed in 98% sulphuric acid which is introduced into the absorption tower F at its top through the pipe J into which the acid is pumped by the pumping apparatus I connected to the tank H, the temperature of this circulating acid being that of ordinary cooling water. The cooling of the sulphuric acid to this temperature is effected by the acid cooler G which connects the bottom of the absorption tower F with the tank H. By this means, the absorption apparatus, the absorption temperature of which is preferably maintained below 300° F. accomplishes simultaneous cooling and absorbing of the converted gases.

The method of practising my present invention and the many advantages thereof will, in the main, be fully apparent from the above detailed description thereof. It will be seen that I am enabled to use the sulphurous acid gases direct, containing impurities, and without removing the moisture content thereof. Usually these gases are washed with strong acid to remove the impurities and to eliminate moisture therein, and such purification steps are objectionably complicated and entail the use of undesirable equipment. It will be further seen that the gases are preliminarily cooled to a temperature prior to catalysis for assisting or facilitating the separation of the dust therein, the temperature being maintained above that point at which moisture will condense and affect the apparatus. The contact mass used is unaffected by water so that the $SO_2$ gas can be converted to $SO_3$ while moisture is present and so that the $SO_2$ gases containing moisture may be used for conversion to $SO_3$. It will be evident that the reduction of the number of steps and the physical equipment incident thereto in the practise of my process results in a more economical and more easily operable sulphuric acid manufacturing system.

It will also be apparent that while I have shown and described my invention in the preferred form, many changes and modifications may be made in the structure disclosed without departing from the spirit of the invention, defined in the following claims.

I claim:

1. The herein described contact process of producing sulphuric acid which consists in passing into the pyrites burner undried air containing its normal moisture content, in then passing the mixture of air and gases generated in the burner through a cooler and then through a catalyzer unaffected by the moisture content of the mixture, and in thereafter passing the sulphuric anhydrid gas mixture generated in the catalyzer through an absorber, the temperature of the gases from the burner to the absorber being maintained above 500° Fahrenheit.

2. In the herein described contact process of producing sulphuric acid, the steps which consist in passing into the pyrites burner undried air containing a normal moisture content, in then cooling the mixture of air and gases generated in the burner to a temperature of from 500° to 600° Fahrenheit being substantially below the temperature required for catalysis and in then passing the then cooled mixture of air and gases through a catalyzer unaffected by the moisture content of the mixture.

3. The herein described contact process of producing sulphuric acid which consists in passing into the pyrites burner air containing a normal moisture content, in then passing the mixture of air and gases generated in the burner through a catalyzer unaffected by the moisture content of the mixture, in thereafter passing the sulphuric anhydrid gas mixture generated in the catalyzer and at the exit temperatures thereof directly into an absorber and in concomitantly cooling and absorbing said sulphuric anhydrid gas in said absorber.

4. The herein described contact process of producing sulphuric acid which consists in passing into the pyrites burner undried air containing a moisture content not greater than that required for producing 98% sulphuric acid, in then cooling the mixture of air and gases generated in the burner and in passing the same through a catalyzer unaffected by the moisture content of the mixture, in thereafter passing the sulphuric anhydrid gas mixture generated in the catalyzer and at the high exit temperatures thereof directly into an absorber and in absorbing said sulphuric anhydrid gas in said absorber by a 98% sulphuric acid cooled to ordinary atmospheric temperatures.

Signed at Charlotte, in the county of Mecklenburg and State of North Carolina, this 27th day of January, A. D. 1928.

INGENUIN HECHENBLEIKNER.